United States Patent [19]

Musha et al.

[11] Patent Number: 4,544,838
[45] Date of Patent: Oct. 1, 1985

[54] METHOD AND APPARATUS FOR DETECTING TRACKING ERROR

[75] Inventors: Toru Musha; Kenichi Ito, both of Hachioji, Japan

[73] Assignee: Olympus Optical Co., Ltd., Japan

[21] Appl. No.: 426,895

[22] Filed: Sep. 29, 1982

[30] Foreign Application Priority Data

Oct. 30, 1981 [JP] Japan ................................ 56-172966

[51] Int. Cl.$^4$ ................................................ G05B 1/00
[52] U.S. Cl. ...................................... 250/202; 369/44
[58] Field of Search .............................. 369/44, 45, 46; 250/201, 204, 202

[56] References Cited

U.S. PATENT DOCUMENTS

| | | |
|---|---|---|
| 3,381,086 | 4/1968 | Moss et al. |
| 4,025,784 | 5/1977 | Lehureau et al. ...................... 369/46 |
| 4,051,528 | 9/1977 | Takeda et al. ....................... 358/128 |
| 4,057,833 | 11/1977 | Braat ..................................... 369/46 |
| 4,410,969 | 10/1983 | Maeda ................................... 369/46 |

Primary Examiner—David C. Nelms
Assistant Examiner—J. Gatto
Attorney, Agent, or Firm—Parkhurst & Oliff

[57] ABSTRACT

A tracking error of a light spot focused on an optical record disc by means of an objective lens with respect to an information track recorded on the disc is detected by processing outputs from a light detector arranged in a far field of the track and having four light receiving regions on which a light reflected by the disc is incident. A tracking error signal of a differential detection system, i.e. a difference between two sums of outputs from two pairs of two regions aligned in a direction tangential to the track is derived, and a push-pull signal, i.e. a difference between two sums of outputs of two pairs of two light receiving regions aligned in a radial direction is also obtained. Zero crossings of the push-pull signal are detected to produce sampling pulses and the tracking error signal of differential system is sampled by the sampling pulses to derive a tracking error signal which is substantially free from disturbance due to a possible shift of the light impinging upon the light detector with respect to the optical axis of objective lens.

15 Claims, 26 Drawing Figures

FIG_1
PRIOR ART
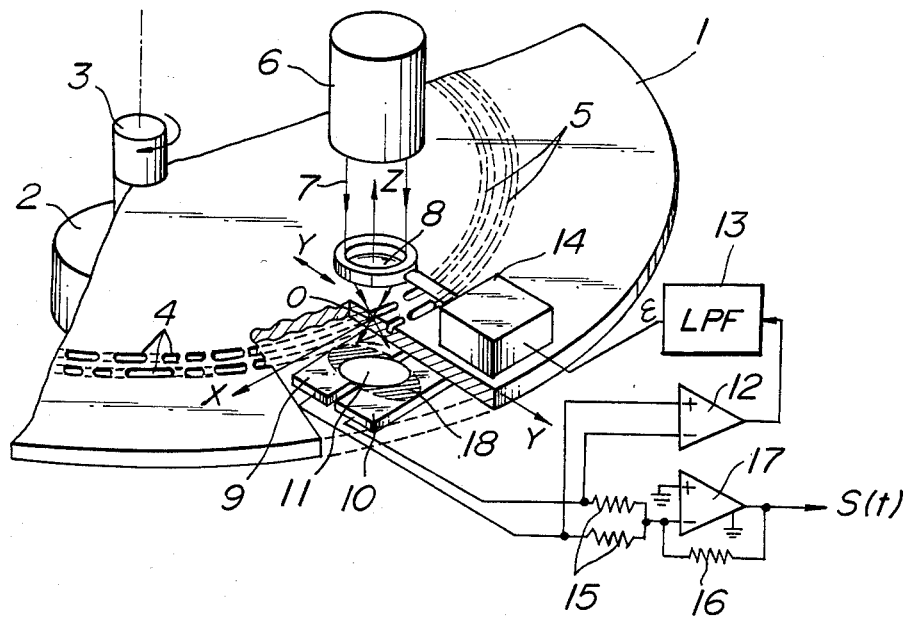
FIG_2
PRIOR ART
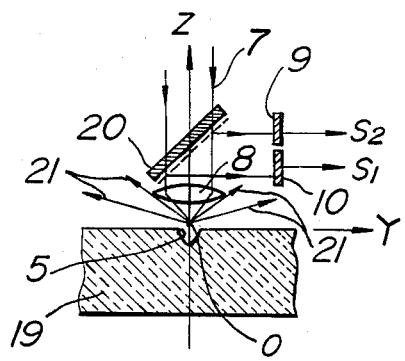

FIG.12
Positional Relation Between Light Spot and Pit
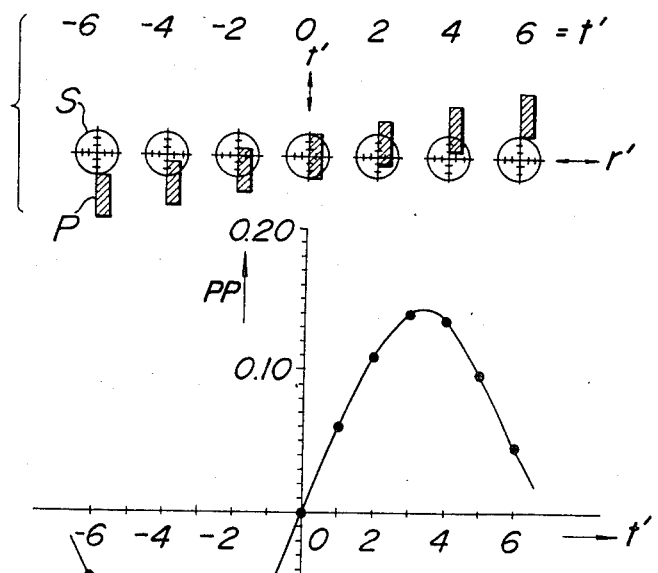
$PP = (a+b) - (c+d)$
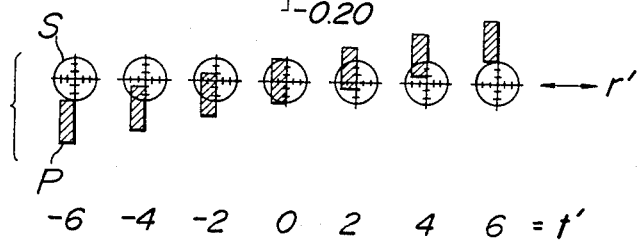
Positional Relation Between Light Spot and Pit

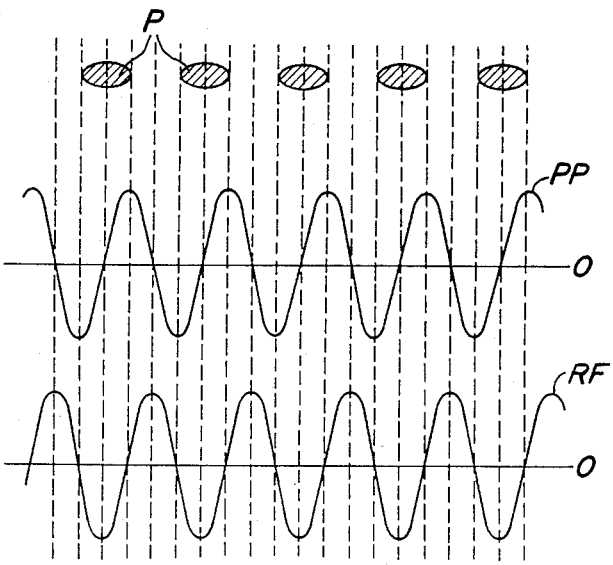
FIG.13A
FIG.13B
FIG.13C
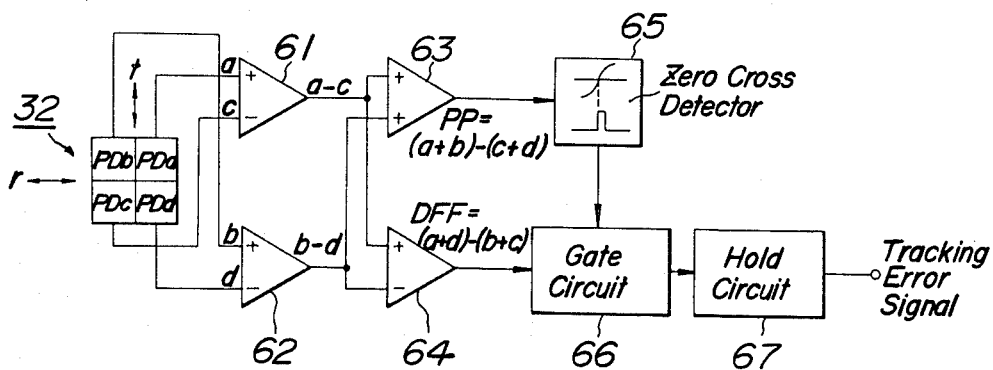
FIG.14

FIG.17
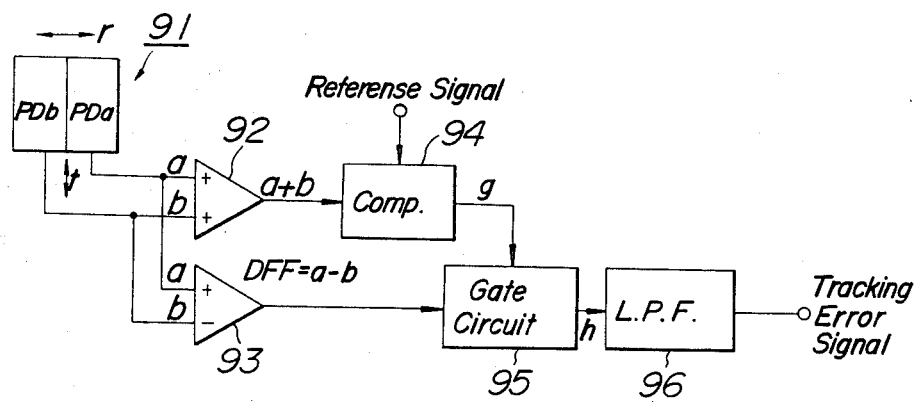
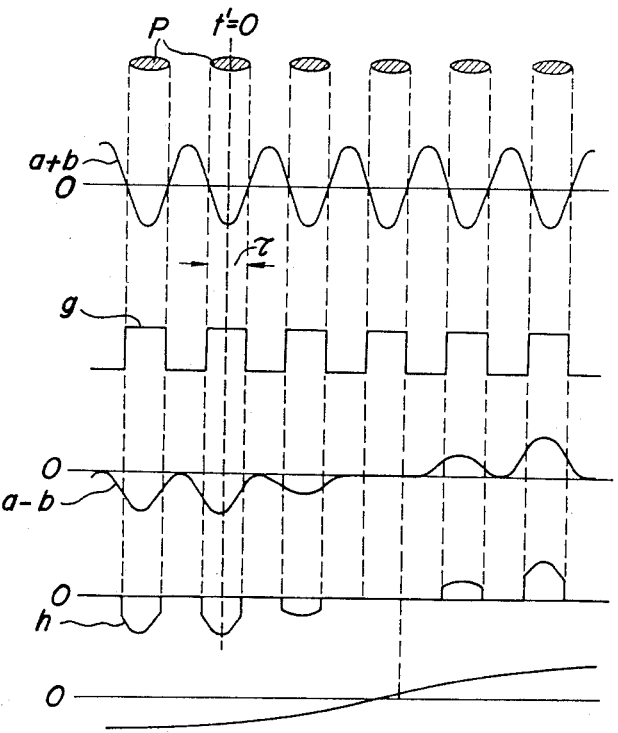
FIG.18A
FIG.18B
FIG.18C
FIG.18D
FIG.18E
FIG.18F

METHOD AND APPARATUS FOR DETECTING TRACKING ERROR

BACKGROUND OF THE INVENTION

This invention relates to a method and an apparatus for detecting a tracking error, i.e., a deviation of a light spot projected by an objective lens on a record medium with respect to an information track on the record medium, viewed in a direction perpendicular to an optical axis of the objective lens as well as to the information track.

For instance, there has been proposed an optical disc reproducing apparatus in which an information signal recorded as a series of pits along spiral or concentric information tracks on a disc shaped record medium is reproduced optically by projecting a light spot by means of an objective lens onto the record medium. To reproduce the information signal stably and reliably, it is necessary to decrease radial deviations of the reading light spot on the information track of the disc. To this end, it is first required to derive a tracking error signal representing a magnitude and a direction of the deviation stably and precisely without being affected by disturbances.

FIG. 1 is a perspective view showing an embodiment of a known optical disc player disclosed in U.S. Pat. No. 3,909,608. In FIG. 1, a record medium shaped like a disc is of a transmission type and rotates about a spindle 3 by means of a motor 2. On the disc 1 there are spiral or concentric information tracks 5, each consisting of an array of pits 4. A parallel light beam 7, emitted from a light source 6 along an optical axis Z, is focused by an objective lens 8 onto a point O on the track, thereby forming a very small light spot. The focused light is transmitted through the transparent disc 1 and the diverging light flux is incident upon a region 11 on a light detector comprising two light receiving regions 9 and 10 arranged in a side by side relationship. The light receiving regions 9 and 10 are divided along a line parallel to an axis OX which passes through the point 0 to be read out and is tangential to the information track 5.

Output signals derived from the light receiving regions 9 and 10 are supplied to a differential amplifier 12 to produce a first difference signal which is then supplied to a low pass filter 13. The low pass filter 13 produces a tracking error signal $\epsilon$ which is supplied to an electrical-mechanical transducer 14 for moving the objective lens 8 in a disc radial direction, i.e., OY direction so as to correct the deviation of the light spot with respect to the information track 5 in the tracking direction.

At the same time, the output signals from the light receiving regions 9 and 10 are summed up by a summing circuit, comprising resistors 15 and the summed up signal is amplified by an operational amplifier 17, having a feedback resistor 16, thereby producing an information signal S(t). In this manner, the information signal is reproduced from the disc shaped record medium 1.

In the above apparatus, when the point O at which the light spot is focused is situated on an intermediate area of successive pits 4 in the same track, no diffraction is present, resulting in the light receiving regions 9 and 10 receiving the medium radiant energy within the region 11. Contrary to this, when the light spot is incident upon a boundary of the pits 4, the light beam is diffracted and radiant energy is then incident upon a hatched region 18 which is wider than the region 11. Therefore, the amplitude of the sum signal S(t) of the outputs from the two light receiving regions 9 and 10 varies while the light spot scans the information track 5. The sum signal S(t) has a substantially rectangular waveform which corresponds to the passage of the light spot through the pits 4 and thus accurately represents the information signal recorded on the disc 1 along the information track 5.

FIG. 2 is a cross section showing another embodiment of a known optical disc reproducing apparatus of a reflection type. In this embodiment an information record medium 19 is made of opaque material. A parallel light flux 7, emitted from a light source (not shown), is transmitted through a half mirror 20 and subsequently focused by an objective lens 8 onto the record medium 19 as a light spot. Light reflected by the record medium 19 is collected by the objective lens 8 and formed into a parallel light beam which is then reflected by the half mirror 20 toward the light receiving regions 9 and 10, which are arranged in a side by side relationship. When the light spot is incident upon an intermediate region between successive pits, the production of a reflected light beam having an intensity which is substantially equal to that of the incident light beam occurs. However, when the light spot is incident upon the boundary of the pit, the light is diffracted outside the objective lens 8, as shown by light rays 21, resulting in a decrease in an amount of the light impinging upon the light receiving regions 9 and 10. Therefore, by processing the output signals $S_1$ and $S_2$ from the light receiving regions 9 and 10, by means of a circuit similar to that shown in FIG. 1, it is possible to obtain the tracking error signal and the information signal.

In the aforediscussed apparatuses, the objective lens 8 moves to effect the tracking control and the light receiving regions 9 and 10 are fixed. When no tracking error exists, an optical axis of the objective lens 8 conincides with the bisecting line of the light detectors 9 and 10 and the light flux is incident upon the two light receiving regions in a symmetrical manner. When the objective lens 8 moves in accordance with the detected tracking error signal $\epsilon$, the symmetrical relationship does not occur. Hence, the tracking error signal may include erroneous components other than the pure tracking error signal, resulting in inaccurate tracking of the disc. The problem may be solved by simultaneously moving the light detector 9 and 10 with the objective lens 8. However, this movable mechanism is complicated in construction, large in size, heavy in weight and it is difficult to incorporate a wide frequency range response into the mechanism. Further, even if such a mechanism for moving the light detector as well as the objective lens is realized, when the record medium 1 is inclined with respect to the optical axis, the light beam incident upon the light detector is shifted, resulting in the same problem. The above problem also occurs in the reflection-type disc reproducing apparatus.

FIG. 3 is a schematic view illustrating how to shift the light beam reflected by a record medium 1 when the record medium is tilted. When the record medium 1 is positioned at a focal point of an objective lens 8, having a focal length f, and inclined by an angle $\Delta\theta$, as shown by the broken line 1', a center axis of the light beam reflected by the record medium 1' is deflected from the optical axis of the objective lens 8 by an angle of $2\Delta\theta$ resulting in the reflected light beam shifting by a distance equal to $f \cdot 2\Delta\theta$.

The above phenomenon is further explained herebelow.

FIG. 4 is a perspective view showing still another embodiment of a known optical disc reproducing apparatus. An objective lens 8 is held by an actuator 31 and is moved in a Z direction (focusing control) as well as in a radial direction r (tracking control) tangential to a track on a disc shaped record medium 19. A light detector 32 comprises four divided light receiving regions PDa, PDb, PDc and PDd, each being formed by, for example, a PIN photodiode. By suitably processing output signals from the four light receiving regions, it is possible to derive an information signal, a focusing error signal and a tracking error signal.

A polarized light beam emitted from a semiconductor laser light source 35 is collimated by a collimator lens 36 and is reflected by a polarizing prism 33. The reflected light is transmitted through a quarter wavelength plate 30 and is focused by the objective lens 8 onto the record medium 19 as a light spot. The light beam reflected by the record medium 19 is collected by the objective lens 8 and is transmitted through the quarter wavelength plate 30. Since the light beam has been passed through the plate 30 twice, the light beam is transmitted through the polarizing prism 33 and is made incident upon a detection prism 34 having major surfaces set at a critical angle with respect to a center light ray of the beam. The light beam departing from the detection prism 34 is incident upon the light detector 32. The construction and operation of this known apparatus has been fully explained in the specification of U.S. patent application Ser. No. 314,482 filed on Oct. 23, 1981, in which there is further disclosure of how to derive the tracking error signal and focusing error signal. Here, a method of detecting the tracking error will be explained briefly.

FIG. 5 is a block diagram showing a circuit for producing RF information signals and focusing and tracking error signals. The light receiving regions PDa, PDb, PDc and PDd of the light detector 32 are divided so that a direction t, corresponding to a tangential direction of the information track, bisects PDa, PDd and PDb, PDc and a direction r, corresponding to the radial direction of the record medium 19, bisects PDa, PDb and PDc, PDd. Now it is assumed that the four light receiving regions PDa, PDb, PDc and PDd produce outputs a, b, c and d, respectively. A sum $S_1$ of the outputs a and c is formed by an adder 37 and a sum $S_2$ of the outputs b and d is derived by an adder 38. Further, a sum $S_3 = S_1 + S_2 = a + b + c + d$ is formed by an adder 39. This sum $S_3$ represents a reproduced RF information signal. To derive the tracking error signal, a difference $S_4 = S_1 - S_2 = (a+c) - (b+d)$ is formed by a subtractor 40. If there is no tracking error, $S_1$ is equal to $S_2$ and therefore, the difference signal $S_4$ is zero. Contrary to this, if there is a tracking error, the difference signal $S_4$ is not equal to zero and its phase is advanced or lagged by 90° with respect to the RF signal $S_3$, in accordance with the direction of the tracking error. Therefore, by detecting the phase of the difference signal $S_4$ with reference to the RF signal $S_3$, it is possible to know the direction of deviation due to the tracking error. For this purpose, the RF signal $S_3$ is supplied to a positive going zero cross detection circuit 41 and a negative going zero cross detection circuit 42 to produce pulses $S_5$ and $S_6$, respectively, at zero cross timings. These pulses $S_5$ and $S_6$ are used as sampling pulses to sample the difference signal $S_4$ in gate circuits 43 and 44 and values thus samled are held in hold circuits 45 and 46, respectively. The sampled and held signals $S_7$ and $S_8$ have been shifted from the RF signal range to the tracking error signal range by means of the sampling and holding process. Moreover, the signals $S_7$ and $S_8$ have a bipolar signal relationship with respect to the tracking center. Therefore, the signals $S_7$ and $S_8$ contain the tracking error components. In order to effect an enhancement, a difference between the signals $S_7$ and $S_8$ is derived by a subtractor 47 to produce a final tracking error signal $S_9$.

In order to obtain the focusing error signal, a sum of the outputs a and b and a sum of the outputs c and d are formed by adders 48 and 49, respectively, and then a difference $[(a+b)-(c+d)]$ between these sums is determined by a subtractor 50. The determined difference $[(a+b)-(c+d)]$ is passed through a low pass filter 51, thereby producing the focusing error signal.

The tracking error detection system shown in FIGS. 1 and 2 is referred to as a differential system and the tracking error signal derived by this differential system is represented by DFF, while the tracking error detection system illustrated in FIGS. 4 and 5 is referred to as a heterodyne system and the tracking error signal obtained by the heterodyne system is expressed by HTD.

In FIG. 6, a comparison between DFF of the differential detection system and HTD of the heterodyne detection system is made.

As explained above, when the objective lens or the reflection mirror is moved in accordance with the tracking error, with the light detector being fixed, or when the rotating record disc is tilted, the reflected or transmitted light beam incident upon the light detector is shifted. It is now assumed that an amount of this shift is $\Delta r$.

In the left column of the chart shown in FIG. 6, the RF signal, HTD and DFF in the case of $\Delta r = 0$ is shown, and in the right column, the RF signal, HTD' and DFF' in case of $\Delta r \neq 0$ is shown.

It is apparent from FIG. 6 that when the beam is shifted, HTD and DFF are changed by $\Delta$HTD and $\Delta$DFF, respectively. The $\Delta$HTD and $\Delta$DFF are error components caused by the shifting of the beam and in order to accurately effect the tracking control, it is desired to decrease these disturbance components to be as small as possible.

FIGS. 7, 8 and 9 are charts of an intensity distribution of a diffraction pattern at the objective lens surface representing variations of RF, HTD, DFF, $\Delta$HTD and $\Delta$DFF in accordance with a variation in a positional relation between the pit on the record medium and the focused light spot. The charts were made with the assumption that the incident beam to the objective lens is a plane wave, the diameter of the beam spot is that of a cross section at which the intensity is decreased to $1/e^2$ of the maximum intensity at a center, and the pit has a length equal to the spot diameter, a width equal to a third of the spot diameter and a depth of $\lambda/5$, being a wavelength of the light beam. This depth corresponds to $\lambda/2.5$ for the transmission type record medium.

A t' axis represents an axis passing through the center of spot S and is tangential to the array of pits P, and an r' axis represents an axis passing through the spot center and extending in a radial direction of the information track. FIG. 7 represents the case of no tracking error, and FIGS. 8 and 9 are charts which illustrate tracking errors in opposite directions. The similar intensity distribution can be obtained in a region which may be considered to be a far field of the track. In the charts, the diameter of the beam spot is set to 4.3 mm and the beam is shifted by $\Delta r = \pm 0.42$ mm on the light receiving region. The amounts of RF, HTD, DFF, $\Delta$HTD and $\Delta$DFF are plotted as signal levels with reference to the light incident upon the objective lens and having a unit intensity.

From the charts shown in FIGS. 7, 8 and 9, it is apparent that the influence of the beam shift $\Delta r$ appears largely in the differential system rather than in the heterodyne system. It should be noted that the variation of $\Delta$HTD and $\Delta$DFF is substantially proportional to the shift amount $\Delta r$.

In the case of the pit depth of $\lambda/4$, the diffraction pattern in the far field region is symmetrical with respect to an origin, so that HTD varies just like the case of the pit depth not equal to $\lambda/4$, but $\Delta$HTD is always zero. Therefore, the heterodyne system is preferably applied to the record medium having the pit depth of $\lambda/4$.

It should be further noted that $\Delta$DFF reaches a minimum when the spot S is symmetrical with respect to the pit P at $t'=0$ and thus, DFF reaches a maximum, as illustrated in FIGS. 8 and 9.

Now, the differential system will be further considered. In this system, $DFF' = DFF + \Delta DFF$ is detected as shown in FIG. 6 and then DFF' is integrated by means of the low pass filter 13, as illustrated in FIG. 1, to derive the tracking error signal. On the other hand, the disturbance component $\Delta$DFF becomes large when the light spot is moved from the symmetrical position $t'=0$ as shown in FIGS. 7 through 9. Therefore, by effecting the integration, a large disturbance component is introduced in the tracking error signal. For instance, when a pit array having long intervals T between successive pits P, as shown in FIG. 10A, is scanned by the assembly, the tracking error signal is affected by the $\Delta r$ shift to a greater extent than in a case of scanning a pit array having shorter intervals T', as shown in FIG. 10B. The inventors have recognized the fact that since the influence of the disturbance is a minimum at $t'=0$, if the tracking error information is detected only at this point, or shortly before or after, it is possible to obtain a precise tracking error signal without being affected by the $\Delta r$ shift of the light beam spot, with respect to the light detector.

SUMMARY OF THE INVENTION

The present invention has for its object to provide a novel and useful method for detecting a tracking error signal precisely and stably by extracting only those portions of a tracking error signal of a differential detection system, which are situated at the symmetrical point $t'=0$ or within a small range about said symmetrical point.

According to the invention, a method for detecting a tracking error of a light spot projected by an objective lens onto a record medium, with respect to a spiral or concentric information track composed of an pit array, viewed in a direction perpendicular to the optical axis of the objective lens and perpendicular to the information track, comprises:

introducing a light flux reflected by or transmitted through the record medium onto a light detector arranged in a far field of the information track and having at least two light receiving regions divided along a direction corresponding to a tangential direction of the information track to produce photoelectrically converted outputs;

deriving a difference signal between said outputs; and producing a tracking signal by extracting those portions of the difference signal which occur during time intervals, each of which includes such a timing that the light spot is located at a center of a pit, when viewed in a tangential direction.

The invention also relates to an apparatus for detecting a tracking error of a light spot with respect to an information track on a record medium, which can produce a tracking error signal stably and precisely by means of a simple circuit construction.

Additionally, according to the invention, an apparatus for detecting a tracking error of a light spot projected by an objective lens a record medium, with respect to a spiral or concentric information track composed of a pit array, viewed in a direction perpendicular to an optical axis of the objective lens as well as to the information track comprises:

a light detector arranged in a far field of the information track and having at least two light receiving regions divided along a direction corresponding to a tangential direction to the information track for receiving a light flux reflected by or transmitted through the record medium to produce photoelectrically converted outputs;

means for producing a difference signal between said outputs; and means for producing a tracking error signal by extracting those portions of the difference signal which occur during time intervals each of which includes such a timing that the light spot is located at a center of a pit, viewed in the tangential direction.

BRIEF DESCRIPTION OF THE DRAWINGS

FIG. 1 is a perspective view showing an embodiment of a known optical disc reproducing apparatus, comprising a tracking error detection system;

FIG. 2 is a cross section illustrating another embodiment of a known optical disc reproducing apparatus;

FIGS. 11 and 12 are charts showing a variation of a push-pull signal in accordance with a positional relationship between spot and pits;

FIGS. 13A, 13B and 13C are graphs showing the pit array, push-pull signal and RF signal, respectively;

FIGS. 14, 15, 16 and 17 are block diagrams illustrating four embodiments of the tracking error detecting apparatus according to the invention; and FIGS. 18A to 18F are signal waveforms for explaining an operation of the apparatus shown in FIG. 17.

DESCRIPTION OF THE PREFERRED EMBODIMENTS

According to the invention, it is necessary to detect the timing ($t'=0$) at which the center of the focused spot passes in the direction of a $t'$ axis through the $r'$ radial axis passing through the center of the pit on the record medium, or a timing near said timing ($t'=0$).

Figure 3:
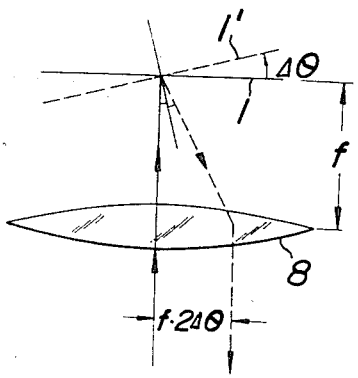
FIG. 3 is a schematic view showing a shift of a light beam due to inclination of an optical disc.
Figure 4:
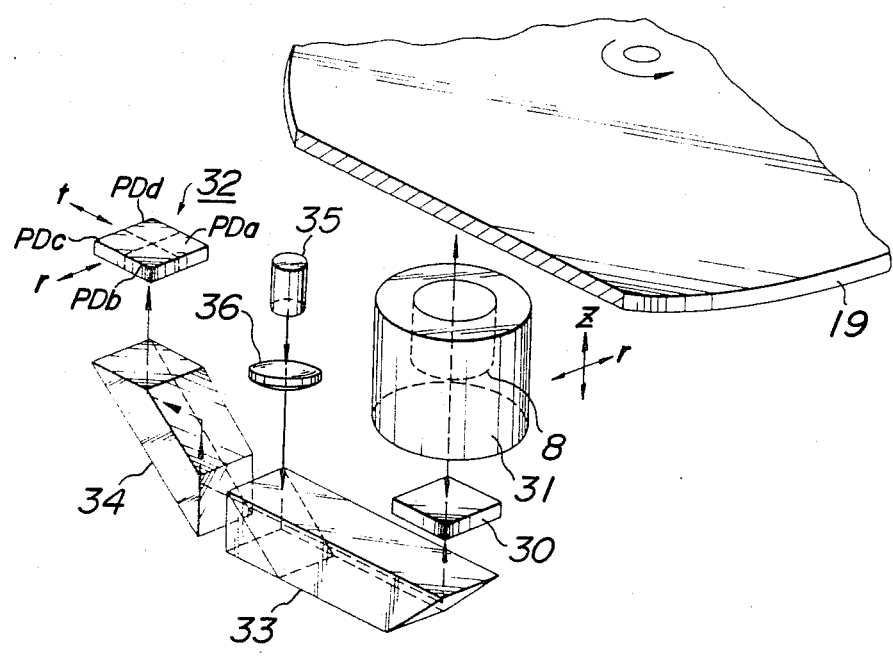
FIG. 4 is a perspective view depicting another embodiment of a known optical disc reproducing apparatus.
Figure 5:
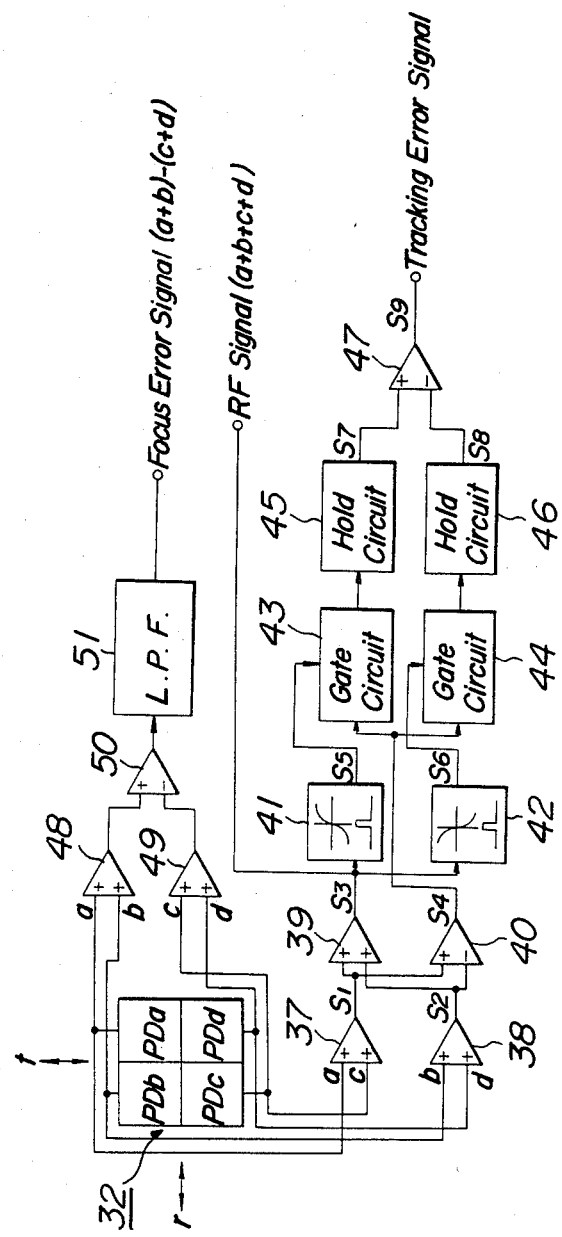
FIG. 5 is a block diagram illustrating a signal processing circuit of the apparatus of FIG. 4.
Figure 6:
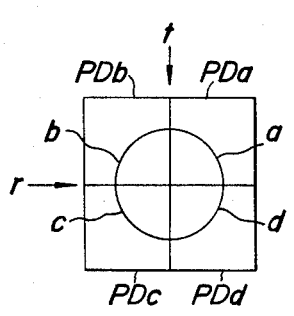
FIG. 6 is a chart showing deviations of the tracking error signals due to the beam shift in the known tracking error detection systems.
Figure 7:
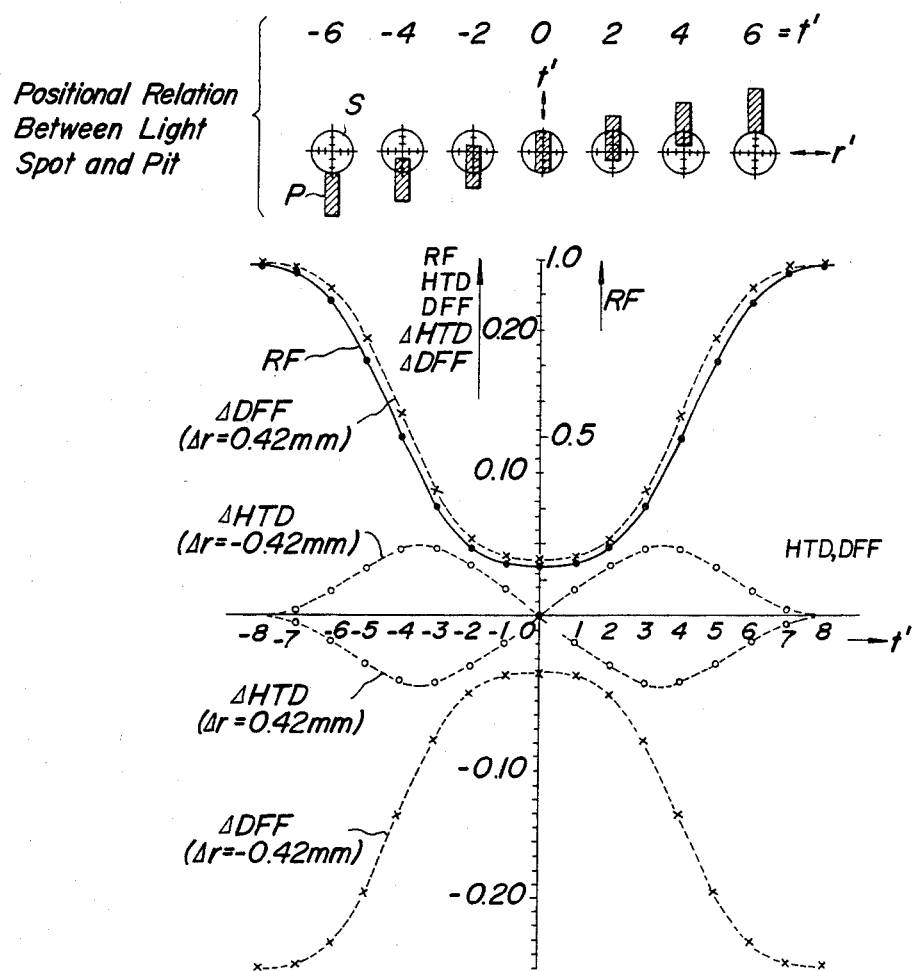
FIGS. 7, 8 and 9 are graphs illustrating the variation of the tracking error signals in the known tracking error detection system.
Figure 8:
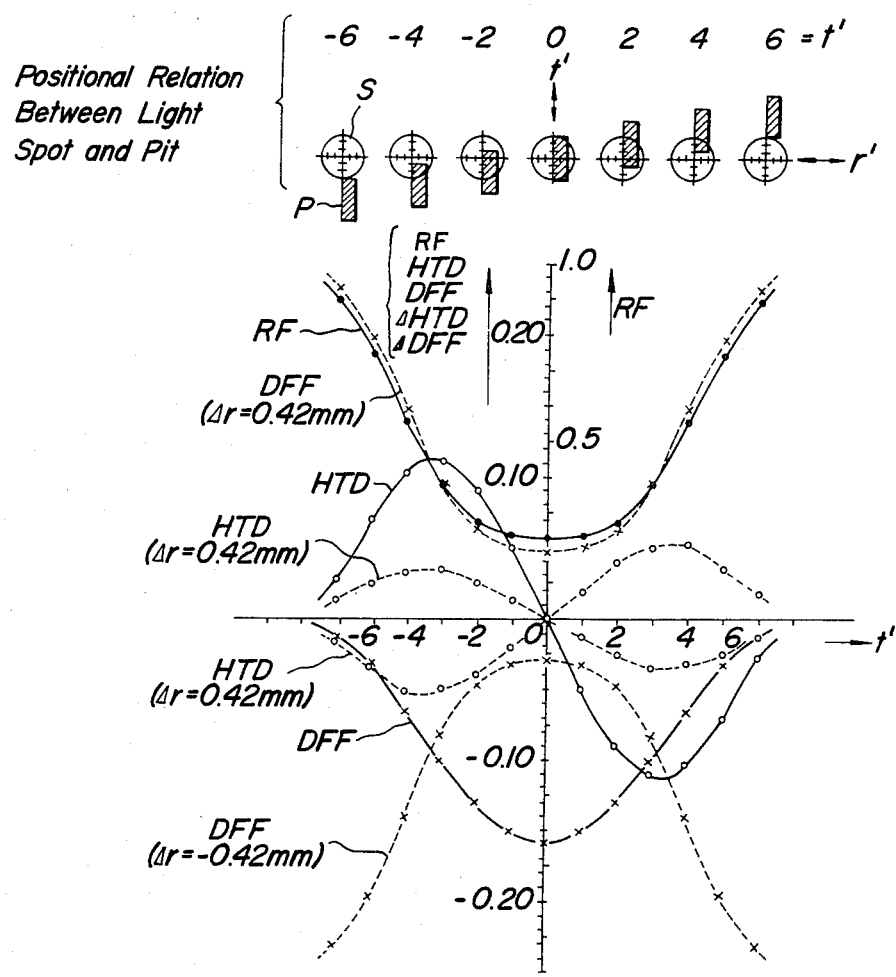
Figure 9:
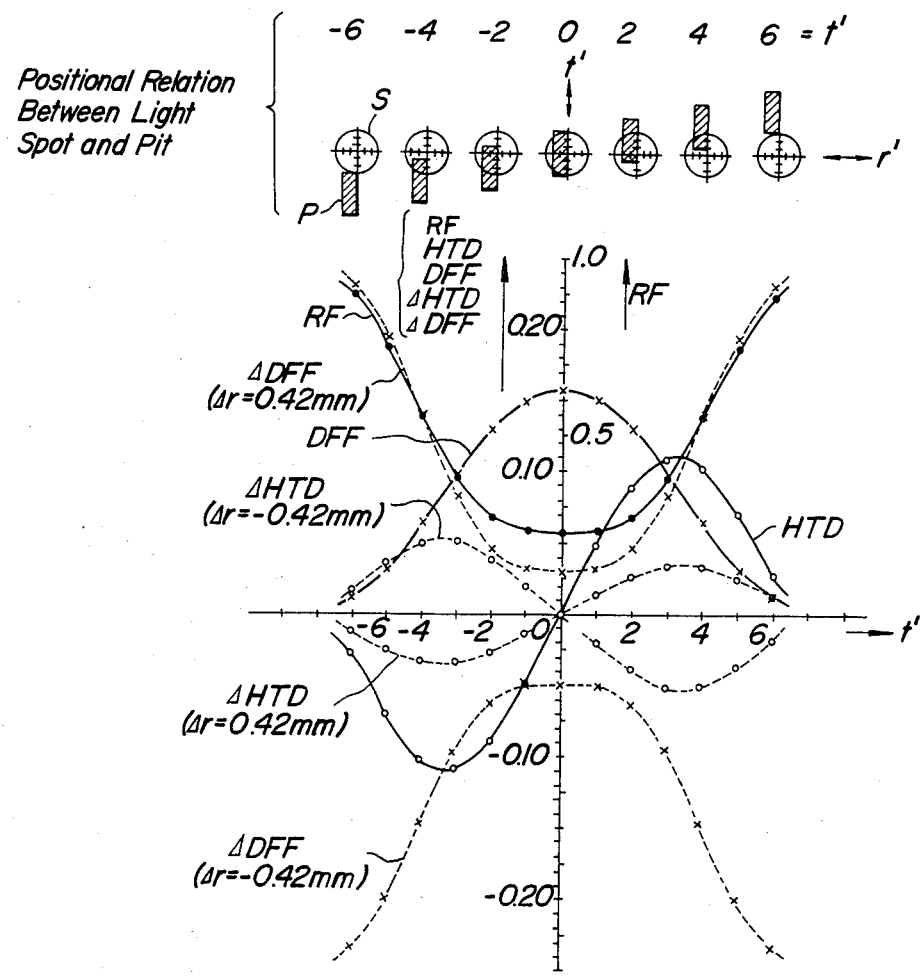
Figure 10A:
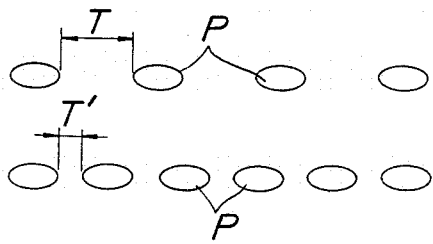
FIGS. 10A and 10B are schematic views showing pit arrays having intermediate regions of different lengths.
Figure 10B:
Figure 11:
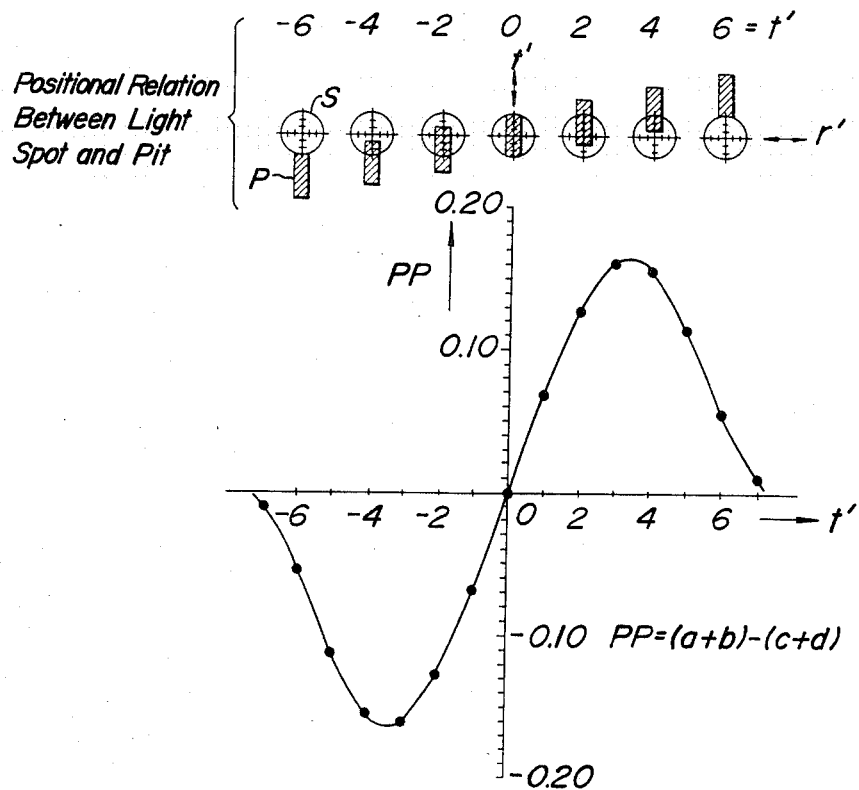

FIGS. 11 and 12 are graphs showing a variation of a push-pull output signal PP-$(a+b)-(c+d)$ derived from the outputs a, b, c and d of the four light receiving regions PDa, PDb, PDc and PDd arranged in the t and r directions as shown in FIG. 5. The variation is illustrated with respect to the positional relation between the spot S and the pit P. These charts show that the signal PP is always zero at the timings of $t'=0$, irrespective of the tracking error. The conditions under which these charts are calculated are entirely the same as those in FIGS. 7 through 9.

FIG. 13A shows an array of pits P, FIG. 13B illustrates the push-pull signal PP and FIG. 13C represents the RF signal $(a+b+c+d)$. These figures show that the PP signal and RF signal always have a phase difference of $\pi/2$ between them. Therefore, by shifting the phase of the RF signal by $\pi/2$, it is possible to derive the signal which becomes zero at the timings $t'=0$.

By supplying the push-pull signal PP or the RF signal phase-shifted by $\pi/2$ to a known zero crossing detection circuit, it is possible to obtain pulses having the desired timings $t'=0$.

FIG. 14 is a block diagram showing an embodiment of the tracking error detecting apparatus according to the present invention. In this embodiment, the push-pull signal PP is used to produce pulses for sampling the tracking error signal DFF obtained by the differential system. A light detector 32 comprises four light receiving regions PDa, PDb, PDc and PDd, which are arranged in the same manner as that in FIG. 5. That is to say, a direction t, bisecting the regions PDa, PDd and PDb PDc, corresponds to the tangential direction $t'$ to the pit array on the record medium and a direction r bisecting the regions PDa, PDb and PDc, PDd corresponds to the radial direction $r'$ of the pit array.

The outputs of the diagonally aligned light receiving regions PDa and PDc are supplied to a subtractor 61 to produce a first difference signal $(a-c)$. Similarly, the outputs of the diagonally aligned light receiving regions PDb and PDd are supplied to a subtractor 62 to produce a second difference signal $(b-d)$. These difference signals $(a-c)$ and $(b-d)$ are supplied to i.e., a push-pull signal $PP=(a+b)-(c+d)$ and a tracking error signal $DFF=(a+d)-(b+c)$, respectively. As explained before with reference to FIGS. 11 and 12, the push-pull signal PP includes zero crossing points a $t'=0$. Then, the push-pull signal PP is supplied to a zero cross detecting circuit 65 to produce sampling pulses at either positive going zero cross points, or negative going zero cross points. The sampling pulses at the timings of $t'=0$ are obtained in this manner.

The tracking error signal DFF, derived from the subtractor 64, is supplied to a gate circuit 66 in which the signal DFF is sampled by the sampling pulses from the zero cross detecting circuit 65. Then, the sampled values are stored in a holding circuit 67. Therefore, it is possible to stably obtain a precise tracking error signal which is substantially free from disturbances, because the signal DFF, derived by the differential detection system, is sampled at the timings $t'=0$, precisely when the erroneous component DFF reaches a minimum.

Figure 15:
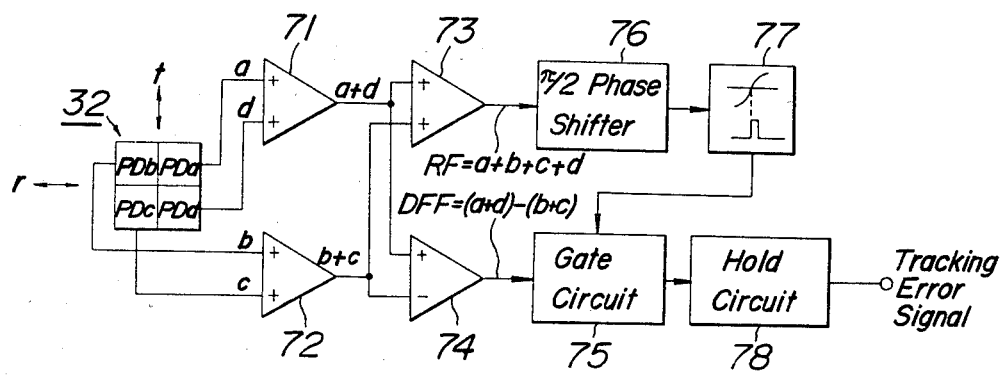

FIG. 15 is a block diagram showing another embodiment of the tracking error detecting apparatus according to the present invention. In this embodiment, the sampling pulses at $t'=0$, are produced by detecting zero crossings of the RF signal shifted by an amount $\pi/2$. A light detector 32 comprises four light receiving regions PDa, PDb, PDc and PDd, which are arranged in the same manner as the previous embodiment shown in FIG. 14, with respect to the axes r and t. Outputs a and d from the regions PDa and PDd, aligned in the t axis, are supplied to an adder 71 to produce a first sum signal $(a+d)$. Similarly, outputs b and c from the regions PDb and PDc, also aligned in the t axis, are supplied to a second adder 72 to derive a second sum $(b+c)$. Then, the first and second sums are supplied to a third adder 73 to generate a RF signal $(a+b+c+d)$. The first and second sums are further supplied to a subtractor 74 to derive a tracking error signal $DFF=(a+b)-(b+c)$ of the differential system, which is then supplied to a gate circuit 75. The RF signal derived from the adder 73 is supplied to a $\pi/2$ phase-shifter 76 and a phase-shifted RF signal is supplied to a zero cross detecting circuit 77. As explained above with reference to FIG. 13, the RF signal is shifted to phase by an amount $\pi/2$ with respect to the PP signal and therefore, when zero crossings of the RF signal shifted by $\pi/2$ are detected, it is possible to obtain sampling pulses from the zero cross detecting circuit 77 at the desired timings of $t'=0$.

The sampling pulses thus obtained are supplied to the gate circuit 75 and the signal DFF is sampled therein. Sampled values are successively stored in a hold circuit 78. Therefore, it is possible to derive a precise tracking error signal at an output of the hold circuit 78.

In an alternative embodiment, the light receiving regions PDa and PDd may be formed by a single light receiving region and the light receiving regions PDb and PDc may be constructed also as a single light receiving region. In such an embodiment, it is apparent that the first and second adders 71 and 72 may be deleted.

Figure 16:
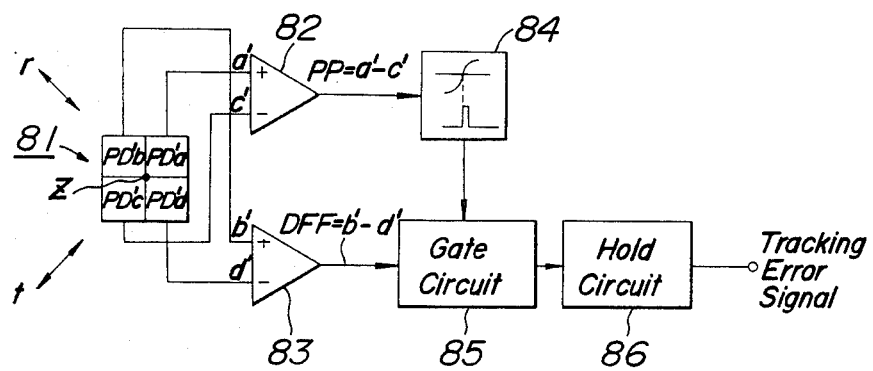

FIG. 16 is a block diagram showing another simplified embodiment of the tracking error detecting apparatus according to the invention. In this embodiment, a light detector 81 comprises four light receiving regions PDa', PDb', PDc' and PDd', which are rotated by an angle of 45° about a Z axis extending parallel to the optical axis. That is to say, the regions PDa' and PDc' are aligned in the axis t and the regions PDb' and PDd' are aligned in the axis r. Outputs a' and c' from the regions PDa' and PDc', respectively, are supplied to a first subtractor 82 to derive a push-pull signal $PP=a'-c'$. Outputs b' and d' from the regions PDb' and PDd', respectively, are supplied to a second subtractor 83 to obtain a tracking error signal for the differential system $DFF=b'-d'$. The push-pull signal PP is supplied to a zero cross detecting circuit 84 to produce sampling pulses at the desired timings of $t'=0$. The tracking error signal of differential system DFF is sampled by the sampling pulses at a gate circuit 85 and sampled values are held in a hold circuit 86 to derive a tracking error signal having a high precision. It should be noted that the present embodiment requires only two subtractors, whereas the embodiment shown in FIG. 14 requires four subtractors.

In the embodiments shown in FIGS. 14 and 16, when the push-pull signal PP is supplied to a low pass filter, it is possible to obtain the focusing error signal as previously explained with reference to FIG. 5.

FIG. 17 is a block diagram showing still another embodiment of the tracking error detecting apparatus according to the invention. A light detector 91 comprises two light receiving regions PDa and PDb divided in the direction of axis t, i.e, aligned in the axis r. Outputs a and b of the regions PDa and PDb are supplied to an adder 92 to provide a sum (a+b), i.e., an RF signal and to a subtractor 93 to derive a difference (a−b), i.e., a tracking error signal of the differential system DFF. The sum (a+b) is compared with a reference signal in a comparing circuit 94 to produce a gating signal g of a suitable duration. The gating signal is supplied to a gate curcuit 5 which also receives the difference (a−b), and desired portions of the difference (a−b) are extracted. A signal h, thus extracted, is supplied to a low pass filter 96 to derive a tracking error signal.

As shown in FIGS. 18A and 18B, the sum (a+b), i.e., RF signal from the adder 92, has a phase corresponding to the pits P on the record medium and therefore, the gating signal g, shown in FIG. 18C, has a phase also corresponding to the pits P. Further, the duration $\tau$ of the gating signal g can be selected at will by adjusting the level of the reference signal. By controlling the gate circuit 95 by means of the obtained gating signal, the desired portions near the timings of $t'=0$ of the difference (a−b), shown in FIG. 18D, can be sampled out to derive the signal h, as illustrated in FIG. 18E. Then, the signal h is supplied to the low pass filter 96 to derive the tracking error signal, shown in FIG. 18F, which is substantially free from noise or disturbance.

As explained in detail above, according to the present invention, the tracking error signal DFF derived by the differential detection system is sampled or extracted by means of the timing signals produced at $t'=0$, at which the disturbance component in the tracking error signal DFF becomes minimum. Therefore, it is possible to always obtain a precise and stable tracking error signal which is substantially free from disturbances, even if the light beam impinging upon the light detector is shifted due to the movement of the objective lens or a tilt of the record medium. Further, the construction of the tracking error detecting apparatus according to the invention is much simpler than that of the known heterodyne detection system.

What is claimed is:

1. A method for detecting a tracking error in a light spot projected by an objective lens onto a record medium with respect to an information track formed by a pit array extending along a tangential direction and viewed in a direction perpendicular to an optical axis of the objective lens as well as to the information track comprising:

introducing a light flux, which is derived from the light spot projected onto the record medium, onto a light detector arranged in a far field of the information track and having at least two light receiving regions divided along a direction corresponding to the tangential direction of the information track to produce photoelectrically converted outputs;

deriving a difference signal between said outputs; and producing a tracking error signal by sampling said difference signal in response to a timing signal representing the positioning of said light spot at substantially the center of a pit along said tangential direction of the information track, to extract those portions of the difference signal which occur during time intervals that correspond in time to said light spot being located at substantially the center of a pit in said tangential direction.

2. A method according to claim 1, wherein said light detector comprises four light receiving regions divided along two orthogonal directions, one direction corresponding to said tangential direction and the other direction corresponding to a radial direction of the information track, and said sampling signals are generated by detecting zero crossings of a push-pull signal which is obtained by deriving a difference between two sums of outputs each of which is supplied from a respective pair of two light receiving regions aligned in said radial direction.

3. A method according to claim 1, wherein said light detector comprises four light receiving regions divided along two orthogonal directions, one direction corresponding to said tangential direction and the other direction corresponding to a radial direction of the information track, an informtion signal is produced by deriving a sum of outputs of all the light receiving regions, the phase of the information signal is shifted by $\pi/2$ and said timing signals are produced by detecting zero crossings of the phase-shifted information signal.

4. A method according to claim 1, wherein said light detector comprises four light receiving regions which are divided along two orthogonal directions, one direction corresponding to the tangential direction rotated by an angle of 45° and the other direction corresponding to a radial direction of the information track rotated by an angle of 45°, said difference signal is produced by deriving a difference between outputs supplied from two light receiving regions aligned in the radial direction, a push-pull signal is produced by deriving a difference between outputs of the remaining two light receiving regions aligned in the tangential direction, and said sampling signals are produced by detecting zero crossings of the push-pull signal.

5. A method according to claim 1, wherein said portions of the difference signal are extracted by means of gating pulses each of which has a given duration including said time at which the light spot is located at the center of a pit.

6. A method according to claim 5, wherein an information signal is produced by deriving a sum of the outputs of the light receiving regions, and the information signal is compared with a predetermined reference level to produce said gating pulses.

7. An apparatus for detecting a tracking error of a light spot projected by an objective lens onto a record medium with respect to an information track formed by a pit array extending along a tangential direction and viewed in a direction perpendicular to an optical axis of the objective lens as well as to the information track comprising:

a light detector arranged in a far field of the information track and having at least two light receiving regions divided along a direction corresponding to the tangential direction of the information track, said light detector being arranged to receive a light flux, which is derived from the record medium in response to the projection of the light spot onto the record medium, to produce photoelectrically converted outputs;

means for producing a different signal between said outputs; and means for producing a tracking error signal from said difference signal by extracting those portions of the difference signal which occur during time intervals that correspond in time to the location of the light spot at substantially the center of a pit along the tangential direction of the information track.

8. An apparatus according to claim 7, wherein said light detector comprises four light receiving regions divided along two orthogonal directions, one direction corresponding to the tangential direction and the other direction corresponding to a radial direction of the information track, and said tracking error signal producing means comprises:

means for producing a push-pull signal which has zero crossings at said time;
means for detecting said zero crossings of the push-pull signal to produce sampling pulses; and
means for sampling and holding said difference signal by means of said sampling pulses to produce the tracking error signal.

9. An apparatus according to claim 8, wherein said push-pull signal producing means comprises means for deriving a difference between two sums of outputs each of which is supplied from a respective pair of two light receiving regions aligned in said radial direction.

10. An apparatus according to claim 9, wherein said push-pull signal producing means comprises a first subtractor for deriving a first difference between outputs of two diagonally aligned light receiving regions, a second subtractor for deriving a second difference between outputs of the remaining two diagonally aligned light receiving regions, and an adder for deriving a sum of said first and second differences.

11. An apparatus according to claim 7, wherein said light detector comprises four light receiving regions divided along two orthogonal directions, one direction corresponding to the tangential direction and the other direction corresponding to a radial direction of the information track, and said tracking error signal producing means comprises:

means for deriving a sum of outputs from all the light receiving regions to produce an information signal;
means for phase-shifting said information signal by $\pi/2$ to produce a phase-shifted information signal;
means for detecting zero crossings of said phase-shifted information signal to produce sampling pulses; and
means for sampling and holding the difference signal with the aid of said sampling pulses to produce the tracking error signal.

12. An apparatus according to claim 7, wherein said light detector comprises four light receiving regions which are divided along two orthogonal directions, one direction corresponding to the tangential direction rotated by an angle of 45° and the other direction corresponding to a radial direction of the information track rotated by an angle of 45°, said means for producing the difference signal comprises a first subtractor for deriving a difference between outputs of two light receiving regions diagonally aligned in the radial direction, and said tracking error signal producing means comprises:

a second subtractor for deriving a difference between outputs of the remaining two light receiving regions diagonally aligned in the tangential direction to produce a push-pull signal;
means for detecting zero crossings of the push-pull signal to produce sampling pulses; and
means for sampling and holding the difference signal by means of the sampling pulses to produce the tracking error signal.

13. An apparatus according to claim 7, wherein said tracking error signal producing means comprises means for producing gating pulses each having a given duration including said time at which the light spot is located at the center of the pit, and gating means for extracting said portions of difference signal by means of the gating pulses to produce the tracking error signal.

14. An apparatus according to claim 13, wherein said gating pulse producing means comprises a circuit for comparing the information signal with a predetermined reference level.

15. An apparatus according to any one of claims 13 and 14, wherein said tracking error signal producing means further comprises a low pass filter connected to an output of said gating means.

* * * * *